Patented June 18, 1940

2,205,100

UNITED STATES PATENT OFFICE 2,205,100

VULCANIZATION OF RUBBER

Joy G. Lichty, Stow, Ohio, assignor to Wingfoot Corporation, Wilmington, Del., a corporation of Delaware No Drawing. Application May 28, 1937, Serial No. 145,303

20 Claims. (Cl. 260—793)

This invention relates to the vulcanization of rubber. More particularly, it relates to the acceleration of the vulcanization of rubber by the use of compounds derived from dithio acids and certain poly halogen ketones.

It is known that certain dithio acid derivatives of dichlor acetones are useful as accelerators of vulcanization, the same being described in British Patent No. 360,490. It has now been discovered that accelerators definitely superior to those previously described are obtained by reacting with dithio acid derivatives, poly halogen ketones having more than two halogen atoms in the molecule, such as the poly chlor ketones having the general formula,

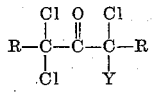

in which Y is chlorine or hydrogen and R is, in each instance, either an aliphatic or an aromatic radical, or hydrogen. In other words, these new accelerators are dithio acid derivatives of alpha poly halogen ketones containing from three to four halogen atoms in the alpha position to the carbonyl group but not more than two such halogen atoms are on the same carbon atom.

In one method of preparing these accelerators the poly chlor ketone or other poly halogen ketone is treated with a reactive metal salt of the dithio acid. In the resulting reaction the chlorine atoms in the poly chlor ketone are believed to be replaced by dithio acid radicals to yield accelerators of the probable formula,

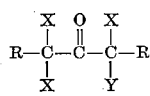

in which each X represents a dithio acid radical which may be indicated by the formula

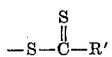

Y is a dithio acid radical or hydrogen and each R is either an aliphatic or an aromatic radical or hydrogen. However, it is to be understood that the identity of the accelerators of the invention is not known with certainty and they are therefore referred to as reaction products.

The practice of the invention may be demonstrated by the preparation of a dithio acid derivative of a poly chlor acetone prepared by the following method. A mixture of 464 grams of acetone, 10 cc. of methyl alcohol and 300 grams of calcium carbonate was placed in a three liter round-bottom flask fitted with an inlet tube, a reflux condenser, and a stirring device. Chlorine was then bubbled into the mixture and water was added from time to time to dissolve the calcium chloride formed. Also, a total of 780 grams more calcium carbonate was added during the reaction. The total amount of water added was approximately one and a half liters. The first stage of the chlorination was conducted with cooling but later the reaction proceeded better at a temperature of about 50° C. The reaction was stopped at the end of 40 hours. The aqueous solution was extracted with ether and dried with calcium chloride. Distillation gave two fractions as follows:

|   | Grams |
|---|---|
| Fraction 1—B. P. 115–125° C | 459 |
| Fraction 2—B. P. chiefly 96° C./60 mm | 170 |

The analysis of Fraction 1 showed that it was dichloracetone. Fraction 2 had a specific gravity of 1.45 at room temperature and had, by analysis, a chlorine content of 60%. It is believed to have been either a constant-boiling mixture of dichloracetone and higher polychloracetones, such as $\alpha, \alpha, \alpha'$ tri chlor acetone and $\alpha, \alpha, \alpha', \alpha'$ tetrachloracetone, or a hydrate of $\alpha, \alpha, \alpha'$ trichloracetone. Fraction 2 also did not hydrolyze readily as do poly chlor acetones having three chlorine atoms attached to one carbon atom.

A 32.3 gram portion of Fraction 2 was added with stirring to an aqueous solution containing 0.6 mol of sodium dimethyl dithiocarbamate. An oil separated and solidified, in part, on standing. The dark plastic product was then filtered off and dried. When dry it weighed 53 grams which represents a yield of 74.6%, assuming the halogen compound to have been trichloracetone monohydrate.

Other accelerators coming within the purview of the invention may be similarly prepared by substituting other dithio acids, preferably in the form of alkali metal salts, and suitable poly chlor ketones for the dimethyl dithiocarbamic acid and poly chlor acetone of the example.

Included among other dithio acids which may be thus employed are di N-butyl dithiocarbamic acid, dibenzyl dithiocarbamic acid, ethyl dithiocarbamic acid, cyclohexyl dithiocarbamic acid, diallyl dithiocarbamic acid, methyl ethyl dithiocarbamic acid, diethyl dithiocarbamic acid, di(isopropyl) dithiocarbamic acid, dihexyl dithiocarbamic acid, diclohexyl dithiocarbamic acid, tetrahydro alphafurfuryl cyclohexyl dithiocarbamic acid, methyl phenyl dithiocarbamic acid, pentamethylene dithiocarbamic acid, etc. Also included are the xanthogenic acids, such as methyl xanthogenic acid, ethyl xanthogenic acid, amyl xanthogenic acid, etc. Other representative dithio acids are dithio furoic acid, dithio benzoic acid, dithio acetic acid, dithio lauric acid, dithio oleic acid, dithio acrylic acid, dithio crotonic acid, ortho amino dithio benzoic acid, dithio salicylic acid, etc. Of the dithio acids, the dithiocarbamic acids derived from secondary amines are particularly useful.

The poly chlor ketones which may be used to prepare the accelerators of the invention as previously defined include $\alpha, \alpha, \alpha'$ trichlor acetone; $\alpha, \alpha, \alpha', \alpha'$ tetrachlor acetone; $\alpha, \alpha, \alpha'$ trichlor dibenzyl ketone; $\alpha, \alpha, \alpha', \alpha'$ tetrachlor benzyl propyl ketone, etc. The acetones are preferred and of these $\alpha, \alpha, \alpha'$ trichlor acetone is preferred.

Other poly halogen ketones may also be used in the practice of the invention, for example, the chlorine in the foregoing illustrative compounds and preparations may be replaced by another halogen such as bromine. Accordingly, $\alpha, \alpha, \alpha'$ tribrom acetone tetra brom methyl ethyl ketone, and other brom ketones may be used.

The reaction products of the invention may, if desired, be prepared by variations of the process or other processes. It is intended to include in the invention the reaction products as defined or any mixture of them whatever method of preparation may be employed. However, it will ordinarily be desirable to conduct the reaction at a temperature less than 100° C. and preferably below 50° C.

The accelerators of the invention may be used in most of the usual rubber compounding formulae. The following is one formula in which they have been found by test to yield excellent results.

|                        | Parts |
|------------------------|-------|
| Extracted pale crepe   | 100   |
| Zinc oxide             | 5     |
| Sulfur                 | 3     |
| Stearic acid           | 1.5   |
| Accelerator            | .5    |

The derivative of sodium dimethyl dithio carbamate and poly chlor acetone prepared in the illustrative example previously described was incorporated into rubber in accordance with this formula. Samples were cured and tested, yielding the following results:

TRICHLOROACETONE ON SODIUM DIMETHYL DITHIOCARBAMATE

| Cure in mins, °F. | Ultimate tensile | Maximum elongation | Tensile kgs./cm.² | |
|---|---|---|---|---|
| | | | 500% | 700% |
| 10/260 | 19 | 800 | 6 | 13 |
| 20 | 87 | 820 | 15 | 14 |
| 40 | 126 | 760 | 25 | 87 |
| 60 | 146 | 750 | 29 | 106 |
| 80 | 118 | 710 | 31 | 110 |

The physical properties obtainable in samples cured for the short periods indicated demonstrate the excellent accelerator properties of these materials. They also possess a very good delayed action in rubber compounds subjected to cure.

If desired, the materials of the invention may also be employed in conjunction with basic nitrogen containing accelerators such as diphenylguanidine, di(p-amino phenyl) methane, diphenylguanidine neutral succinate, diphenylguanidine neutral phthalate, the acid and neutral oxalic salts of diphenylguanidine and di ortho tolyl guanidine, urea, dibenzylamine, di ortho tolyl guanidine, etc. Of these the diaryl guanidines are preferred.

Although only the preferred forms of the invention have been described in detail, it will be apparent to those skilled in the art that various modifications may be made therein without departing from the spirit of the invention or the scope of the appended claims in which it is intended to cover all features of patentable novelty residing in the invention.

What I claim is:

1. The method of treating rubber which comprises vulcanizing it in the presence of the reaction product of a dithio acid and a halo ketone containing at least three halogen atoms substituted alpha to the carbonyl group but with not more than two such halogen atoms on the same carbon atom.

2. The method of treating rubber which comprises vulcanizing it in the presence of the reaction product of a dithiocarbamic acid and a halo ketone containing at least three halogen atoms substituted alpha to the carbonyl group but with not more than two such halogen atoms on the carbon atom.

3. The method of treating rubber which comprises vulcanizing it in the presence of the reaction product of a dithiocarbamic acid derived from a secondary amine and a halo ketone containing at least three halogen atoms substituted alpha to the carbonyl group but with not more than two such halogen atoms on the carbon atom.

4. The method of treating rubber which comprises vulcanizing it in the presence of the reaction product of a dialkyl dithiocarbamic acid and a halo ketone containing at least three halogen atoms substituted alpha to the carbonyl group but with not more than two such halogen atoms on the carbon atom.

5. The method of treating rubber which comprises vulcanizing it in the presence of the reaction product of a dithio acid and a halo ketone containing three chlorine atoms attached to the carbon atoms alpha to the C=O, not more than two such chlorine atoms being attached to the same carbon atom.

6. The method of treating rubber which comprises vulcanizing it in the presence of the reaction product of sodium dimethyl dithiocarbamate and $\alpha, \alpha, \alpha'$ trichloracetone.

7. The method of treating rubber which comprises vulcanizing it in the presence of the reaction product of a dithio acid and a chlor ketone containing at least three chlorine atoms substituted alpha to the carbonyl group but with not more than two such chlorine atoms on the same carbon atom.

8. The vulcanizates obtainable by the process of claim 1.

9. The vulcanizates obtainable by the process of claim 2.

10. The vulcanizates obtainable by the process of claim 3.

11. The vulcanizates obtainable by the process of claim 4.

12. The vulcanizates obtainable by the process of claim 5.

13. The vulcanizates obtainable by the process of claim 6.

14. The reaction product of a dithio acid and a halo ketone containing at least three halogen atoms substituted alpha to the carbonyl group but with not more than two such halogen atoms on the same carbon atom.

15. The reaction product of a dithiocarbamic acid and a halo ketone containing at least three halogen atoms substituted alpha to the carbonyl group but with not more than two such halogen atoms on the same carbon atom.

16. The reaction product of a dithiocarbamic acid derived from a secondary amine and a halo ketone containing at least three halogen atoms substituted alpha to the carbonyl group but with not more than two such halogen atoms on the same carbon atom.

17. The reaction product of a dialkyl dithiocarbamic acid and a halo ketone containing at least three halogen atoms substituted alpha to the carbonyl group but with not more than two such halogen atoms on the same carbon atom.

18. The reaction product of a dithio acid and a halo ketone containing three chlorine atoms attached to the carbon atoms alpha to the C=O, not more than two such chlorine atoms being attached to the same carbon atom.

19. The reaction product of sodium dimethyl dithiocarbamate and $\alpha, \alpha, \alpha'$ trichloracetone.

20. The reaction product of a dithio acid and a chlor ketone containing at least three chlorine atoms substituted alpha to the carbonyl group but with not more than two such chlorine atoms on the same carbon atom.

JOY G. LICHTY.